(12) United States Patent
Robbins et al.

(10) Patent No.: US 7,744,101 B2
(45) Date of Patent: Jun. 29, 2010

(54) PRODUCT TROLLEY

(75) Inventors: Holly Robbins, St. Paul, MN (US);
Sergio Gedanke, Brooklyn, NY (US);
Linda R. Heath, Minneapolis, MN (US); Jeanette L. Carrell, Shoreview, MN (US)

(73) Assignee: Target Brands, Inc., Minneapolis, MN (US)

( * ) Notice: Subject to any disclaimer, the term of this patent is extended or adjusted under 35 U.S.C. 154(b) by 900 days.

(21) Appl. No.: 11/508,030

(22) Filed: Aug. 22, 2006

(65) Prior Publication Data

US 2007/0170700 A1 Jul. 26, 2007

Related U.S. Application Data

(60) Provisional application No. 60/754,935, filed on Dec. 29, 2005.

(51) Int. Cl.
*B62B 1/22* (2006.01)

(52) U.S. Cl. ............... 280/47.2; 280/47.26; 280/DIG. 3

(58) Field of Classification Search ............... 280/47.2, 280/47.18, 47.24, 63, 638, 40, 652, DIG. 3; 248/98, 129
See application file for complete search history.

(56) References Cited

U.S. PATENT DOCUMENTS

| | | | | |
|---|---|---|---|---|
| 2,375,338 | A | * 5/1945 | Alexander | ............. 280/47.131 |
| 2,482,848 | A | 9/1949 | Grant | |
| 2,610,071 | A | 9/1952 | Davis et al. | |
| 2,868,557 | A | 1/1959 | Klipp et al. | |
| 3,092,395 | A | 6/1963 | Mitty et al. | |
| 3,135,527 | A | 6/1964 | Knapp | |
| 3,276,786 | A | * 10/1966 | Ward | ..................... 280/33.997 |
| 3,427,040 | A | 2/1969 | Jenkins | |
| 3,471,163 | A | * 10/1969 | Swara | ..................... 280/47.26 |
| 3,492,016 | A | 1/1970 | O'Connor et al. | |
| 3,891,245 | A | * 6/1975 | Elsas | ..................... 280/47.131 |
| 3,927,894 | A | * 12/1975 | Zawislak | ..................... 280/8 |
| 4,368,835 | A | 1/1983 | Murphy | |
| 4,563,014 | A | 1/1986 | Mortenson | |
| 4,593,841 | A | 6/1986 | Lange | |
| 4,596,397 | A | 6/1986 | Conti | |
| 5,125,675 | A | 6/1992 | Engelbrecht | |
| 5,169,164 | A | * 12/1992 | Bradford | ..................... 280/35 |
| 5,465,987 | A | 11/1995 | DellaVecchia | |
| 6,039,333 | A | 3/2000 | Hamblin | |
| 6,164,425 | A | 12/2000 | Latshaw | |
| 6,247,710 | B1 | 6/2001 | Luberda | |
| D448,907 | S | 10/2001 | Tsai | |
| 6,375,200 | B1 | 4/2002 | Harter | |
| 6,547,263 | B1 | 4/2003 | McGeorge et al. | |

(Continued)

*Primary Examiner*—Frank B Vanaman
(74) *Attorney, Agent, or Firm*—Griffiths & Seaton PLLC (57) ABSTRACT

Product trolleys include a base, a sling assembly, and a roller assembly. The base includes a first sidewall, a second sidewall opposing the first sidewall, and an endwall extending between the first and second sidewalls. The base defines an inner surface, a first open end, a second open end opposite the first open end, and a top opening opposite the endwall. The base includes a spring action between the first sidewall and the second sidewall, such that the base is configured to be flexed to receive and releasably secure the product between the first and the second sidewalls. The sling assembly is secured to the base and includes a substantially flexible body formed of sheet material. The roller assembly is secured to the base proximate the endwall.

12 Claims, 9 Drawing Sheets

U.S. PATENT DOCUMENTS

| | | |
|---|---|---|
| 6,955,365 B2 | 10/2005 | Giampavolo |
| 7,063,339 B2 * | 6/2006 | Jarko et al. ............... 280/47.19 |
| 7,111,851 B2 * | 9/2006 | Duncan ................... 280/47.26 |
| D531,376 S | 10/2006 | Tetradis |

* cited by examiner

PRODUCT TROLLEY

CROSS-REFERENCE TO RELATED APPLICATIONS

This patent application claims priority under 35 U.S.C. §119(e) to U.S. Provisional Patent Application Ser. No. 60/754,935, entitled "PRODUCT TROLLEY," having a filing date of Dec. 29, 2005, the contents of which are incorporated herein by reference. Reference is made to U.S. Design patent application Ser. No. 29/264,955 entitled "PRODUCT TROLLEY," filed on Aug. 22, 2006, now U.S. Design Pat. No. D547,022, the contents of which are incorporated herein by reference.

BACKGROUND OF THE INVENTION

People often find the prospect of moving heavy or large items difficult, if not impossible. For example, people often encounter challenges moving such items while shopping. Consumers or others in a retail environment often have to move products for sale to or from display areas, points of sale, vehicles, homes, and other locations. Dry dog food, for example, is often provided in bulk quantities, with some sacks of dry dog food weighing forty or more pounds. Other items for sale are similarly large, heavy, or cumbersome for a consumer to transport.

SUMMARY OF THE INVENTION

One aspect of the present invention relates to a product trolley including a base, a sling assembly, and a roller assembly. The base includes a first sidewall, a second sidewall opposing the first sidewall, and an endwall extending between the first and second sidewalls. The base defines an inner surface, a first open end, a second open end opposite the first open end, and a top opening opposite the endwall. The base includes a spring action between the first sidewall and the second sidewall, such that the base is configured to be flexed to receive and releasably secure the product between the first and the second sidewalls. The sling assembly is secured to the base and includes a substantially flexible body formed of sheet material. The roller assembly is secured to the base proximate the endwall.

While some aspects of the invention have been described above, other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
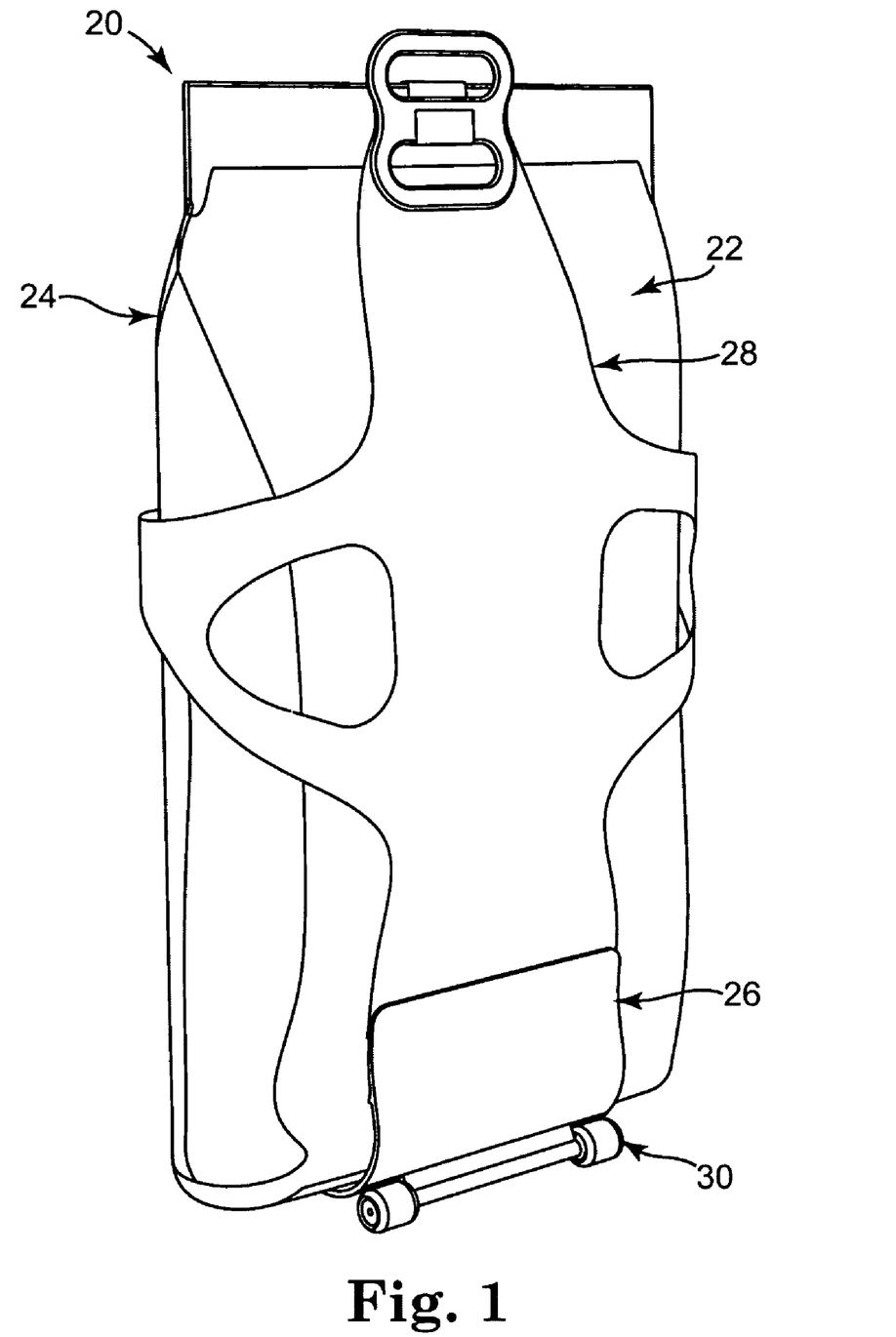
FIG. 1 is a back, perspective view of a product transport system, according to an embodiment of the present invention.

FIG. 1 shows a product transport system 20, or a packaged good transport system, including a product trolley 22, which is otherwise described as a package transport, a trolley, or an article dolly, for example, and a product 24, which is otherwise described as a packaged good or a retail article. Generally speaking, the product trolley 22 includes a base 26, otherwise described as a tray or an article receptacle, a sling assembly 28, or a back support assembly, and a roller assembly 30, or a wheel assembly, and is operable to transport the product 24. For example, the product 24 is supported by the product trolley 22 with a user (not shown) grasping and pulling the product trolley 22 to some desired location, such as a point of sale in a retail environment.

Figure 2:
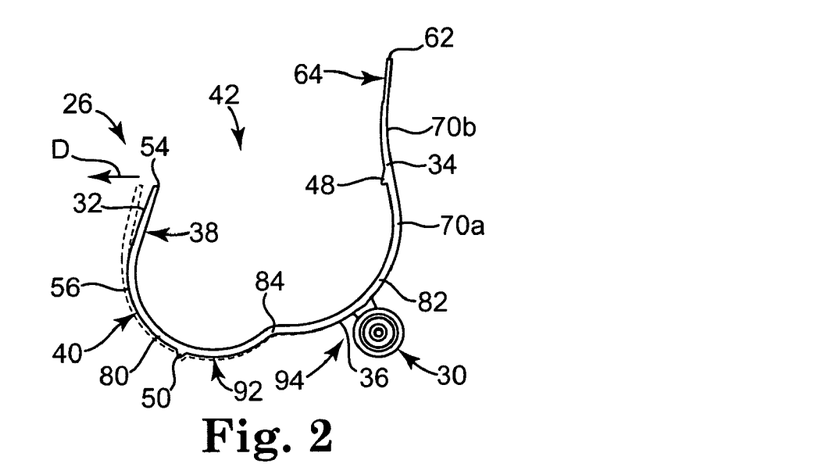
FIG. 2 is a side view of a base of the product transport system of FIG. 1, according to an embodiment of the present invention.

FIG. 2 illustrates a side view of the base 26. With reference to FIG. 2, the base 26 includes a first sidewall 32, a second sidewall 34, and an endwall 36. As will be described in greater detail below, the base 26 optionally incorporates a flex action, such that the base 26 is able to be transitioned between natural and distended positions. However, it should be understood that the base 26, including the entire base 26 or portions of the base 26, is also optionally substantially rigid if desired. It should be noted that positional relationships are described in reference to the natural position of the base 26, unless otherwise indicated. However, it should also be understood that the base 26 optionally defines the relationships described below when in the distended position (shown in dotted lines in FIG. 2).

Figure 3:
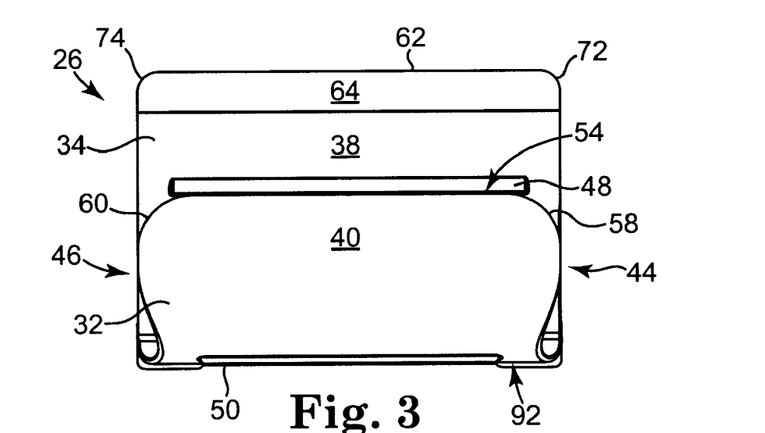
FIG. 3 is a front view of the base of FIG. 2, according to an embodiment of the present invention.

FIG. 3 illustrates the base 26 from a front view. With reference to FIGS. 2 and 3, the base 26 also defines an inner surface 38, an outer surface 40, a top opening 42, a first open end 44, and a second open end 46. The base 26 forms a grip projection 48 and a support projection 50. If desired, the base 26 forms a plurality of support and/or grip projections (not shown). The base 26 is substantially U-shaped in transverse cross-section, or when observed from a side profile (FIG. 2). It is to be noted that a description of the base 26 as "U-shaped," is a macroscopic, or more general characterization. In particular, and as shown in the Figures, the base 26 optionally forms additional curves, flats, and/or other features differing from those of a simple, or traditional, "U." Regardless, the first sidewall 32 and the second sidewall 34 generally project from the endwall 36 in an opposing manner to define a mouth that is able to be flexed to receive and secure the product 24 to the base 26.

With additional reference to FIG. 2, the first sidewall 32 extends substantially continuously from the endwall 36 to a terminal end 54 and defines a width and a wall thickness. The first sidewall 32 is optionally tapered, decreasing in width toward the terminal end 54. Additionally, the first sidewall 32 defines a portion of the inner and outer surfaces 38, 40 of the base 26.

In side profile, the first sidewall 32 optionally curves upwardly and toward the second sidewall 34 at a curved transition 56. Generally, the curved transition 56 is located where the first sidewall 32 transitions to the endwall 36. The curved transition 56 defines a radius of curvature of about 1.92 inches at the outer surface 40 and about 1.75 inches at the inner surface 38, although other dimensions are contemplated. With the first sidewall 32 curving toward the second sidewall 34, the terminal end 54 extends inwardly toward the second sidewall 34. Though not shown, it should also be understood that the first sidewall 32 optionally extends substantially parallel to an extension of the second sidewall 34. With reference to FIG. 3, the first sidewall 32 also defines a first side 58 and a second side 60, each of the first and second sides 58, 60 substantially recurved in shape when viewed from a front profile. The first and second sides 58, 60 define a smooth transition to the terminal end 54 when viewed from a front profile.

The first sidewall 32 optionally forms a projection (not shown), or a plurality of projections, substantially similar to the grip projection 48 if desired. The projection/plurality of projections are optionally formed as an aid for increasing roughness and/or gripping ability of the inner surface 38 at the first sidewall 32, for example. For reference, the grip projection 48 is described in greater detail below in association with the second sidewall 34.

The maximum width of the first sidewall 32 is about 9.5 inches, for example. Additionally, the thickness of the first sidewall 32 is about 0.19 inches and tapers to about 0.11 inches at the terminal end 54, for example. Although examples of some dimensions have been provided, it should be understood that other dimensions are also contemplated.

The second sidewall 34 extends continuously from the endwall 36 to a terminal end 62 and defines a width and a wall thickness. The second sidewall 34 defines a stepped thickness proximate the terminal end 62 to define a handle seat 64. The handle seat 64 is optionally substantially flat, or planar, and is formed to be connected to a portion of the sling assembly 28. While association of the base 26 and the sling assembly 28 is described in greater detail below, in brief, the stepped thickness of the sidewall 34 at the handle seat 64 optionally matches a thickness of the portion of the sling assembly 28 attached to the handle seat 64. In this manner, the sling assembly 28 and the second sidewall 34 define a more smooth and continuous side profile at the handle seat 64 as desired.

The handle seat 64 defines a height of about 0.99 inches, for example. However, other dimensions are also contemplated.

The second sidewall 34 also defines a portion of the inner and outer surfaces 38, 40 of the base 26 and optionally forms the grip projection 48 of the base 26. When viewed from a side profile, the second sidewall 34 defines a maximum rearward projection of the base 26. The second sidewall 34 also curves toward the first sidewall 32 at a first curved transition 70a and then recurves back at a second curved transition 70b. When viewed from a front profile (FIG. 3), the second sidewall 34 defines top corners 72, 74 (FIG. 3), which are rounded as desired to transition smoothly to the terminal end 62.

The first curved transition 70a is generally located where the second sidewall 34 transitions to the endwall 36, while the second curved transition 70b is generally located between the first curved transition 70a and the terminal end 62. The first curved transition 70a defines a radius of curvature of about 2.5 inches and the second curved transition 70b defines a radius of curvature of about 5 inches, although other dimensions are contemplated. As will be understood in greater detail below, one or more of the respective curved transitions 56, 70a, 70b of the first and second sidewalls 32, 34 facilitate a better grip between the first and second sidewalls 32, 34 when the product 24 is assembled with the product trolley 22.

The grip projection 48 of the base 26 promotes gripping performance of the second sidewall 34, and in particular the portion of the inner surface 38 of the base 26 defined by the second sidewall 34. The grip projection 48 protrudes from the inner surface 38 and extends along the width of, or widthwise along, the second sidewall 34. The grip projection 48 is substantially triangular in transverse cross-section, with square and rounded cross-sections also contemplated, for example. It should be understood that a plurality of projections substantially similar to the grip projection 48, for example, are also contemplated to further increase gripping performance.

The width of the second sidewall 34 is about 9.5 inches, for example. The thickness of the second sidewall 34 is about 0.19 inches, and tapers in thickness at the handle seat 64, for example. It should be understood that other dimensions are also contemplated.

The endwall 36 defines a width and a wall thickness and extends substantially continuously between the first sidewall 32 and the second sidewall 34. The endwall 36 forms a toe portion 80 proximate the first sidewall 32, a heel portion 82 proximate the second sidewall 34, and a transition portion 84 between the heel and toe portions 80, 82. The endwall 36 also forms the support projection 50 of the base 26. The endwall 36 optionally has a handle opening 90 (FIG. 4) configured to receive the fingers and/or hand of a user (not shown). It should also be understood that the endwall 36 defines a portion of the inner and outer surfaces 38, 40 of the base 26. The maximum width of the endwall 36 is about 9.5 inches. In turn, the thickness of the endwall 36 is about 0.19 inches, for example. It should be understood that other dimensions are also contemplated.

The toe portion 80 also defines a substantially arcuate side profile. The toe portion 80 extends distally relative to the top opening 42 a greater amount than the heel portion 82. The toe portion 80 also defines a support surface 92. The support surface 92 is rounded in side profile, although the support surface 92 is optionally substantially flat, or planar, for example. In one embodiment, the support surface 92 defines the lowermost, or distal-most, extension of the endwall 36. As will be described in greater detail below, the support surface 92 is configured to support the base 26 on a substantially horizontal surface (not shown). The toe portion 80 defines a radius of curvature of about 1.92 inches, for example, although other dimensions are contemplated.

Figure 10:
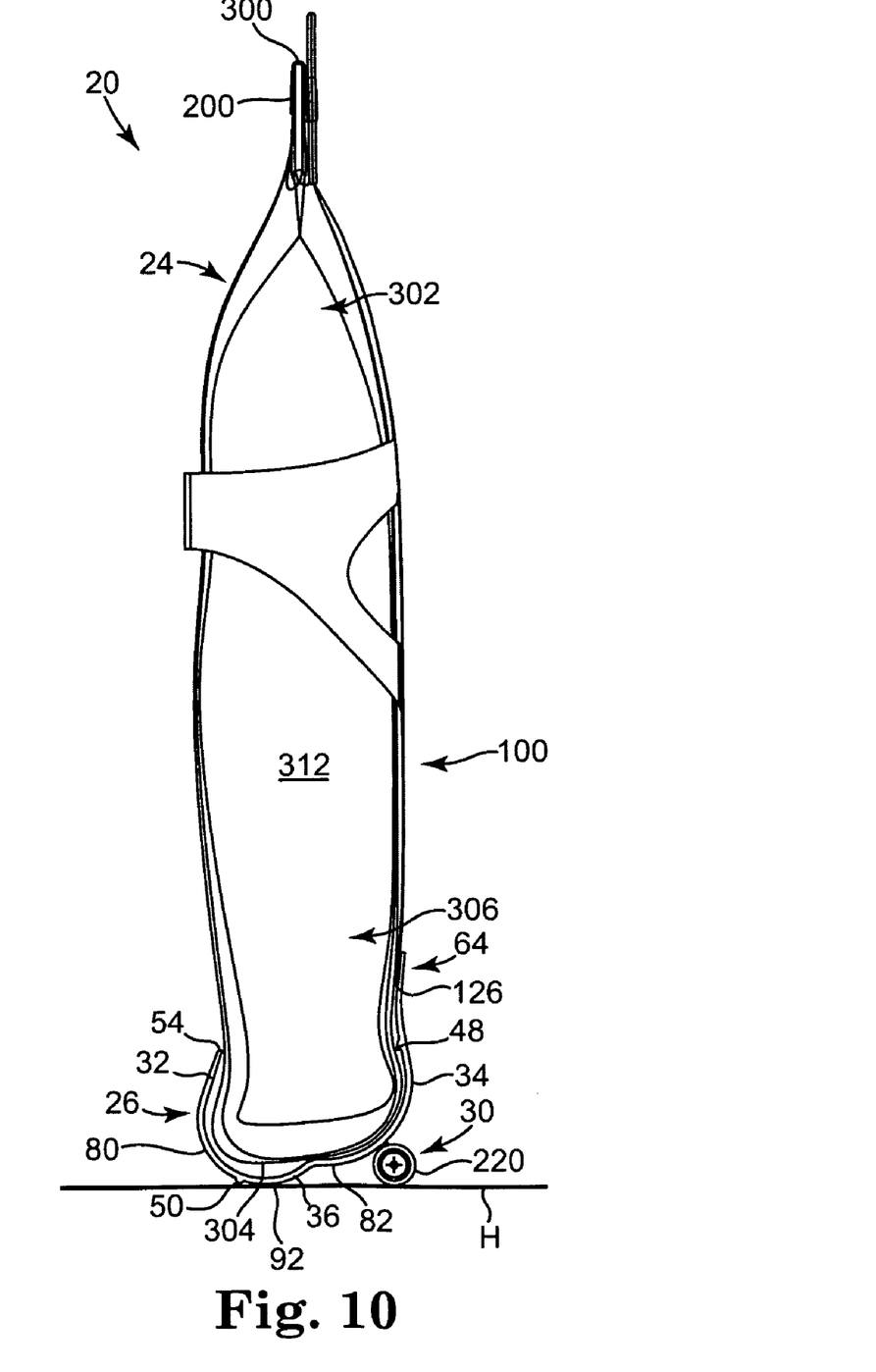
FIG. 10 is a side view of the product transport system of FIG. 1 according to an embodiment of the present invention.

The support projection 50 protrudes angularly and distally from the toe portion 80 and extends along the width of the endwall 36. The support projection 50 is substantially triangular in transverse cross-section, with square and semi-circular cross-sections also contemplated, for example. The support projection 50 is formed to add stability when supporting the base 26 on a substantially horizontal surface. For example, the support projection 50 and the support surface 92 are configured to act in a complementary nature to support the base 26 on a substantially horizontal surface (not shown). The support projection 50 and the support surface 92 are optionally distally coterminous along a horizontal plane H (FIG. 10).

The heel portion 82 is also substantially arcuate when viewed from a side profile. The heel portion 82 extends distally relative to the top opening 42 to a lesser extent than the toe portion 80. In particular, the heel portion 82 is recessed proximally toward the top opening 42. In this manner, the heel portion 82 defines a recess 94, or gap, relative to the distalmost, or lowermost projection of the base 26 at the toe portion 80. In particular, the recess 94 is optionally sized for receiving a portion of the roller assembly 30. The heel portion 82 defines a radius of curvature of about 2.5 inches, although other dimensions are contemplated.

The transition portion 84 is substantially arcuate in transverse cross-section, or when viewed from a side profile. While the toe and heel portions 80, 82 curve upwardly, or proximally, the transition portion 84 generally curves downwardly, or distally. In light of the above descriptions of the toe and heel portions 80, 82, respectively, it should be appreciated that the "recurve" of the transition portion 84 (when viewed from a side profile) facilitates the heel portion 82 being recessed relative to the toe portion 80. More particularly, the "recurve" shape helps promote an ability of the base 26 to support itself in a substantially vertical fashion. Regardless, the transition portion 84 optionally defines a radius of curvature of about 0.7 inches at the inner surface 38 and a radius of curvature of about 0.5 inches at the outer surface 40 of the base 26, although other dimensions are contemplated.

Figure 4:
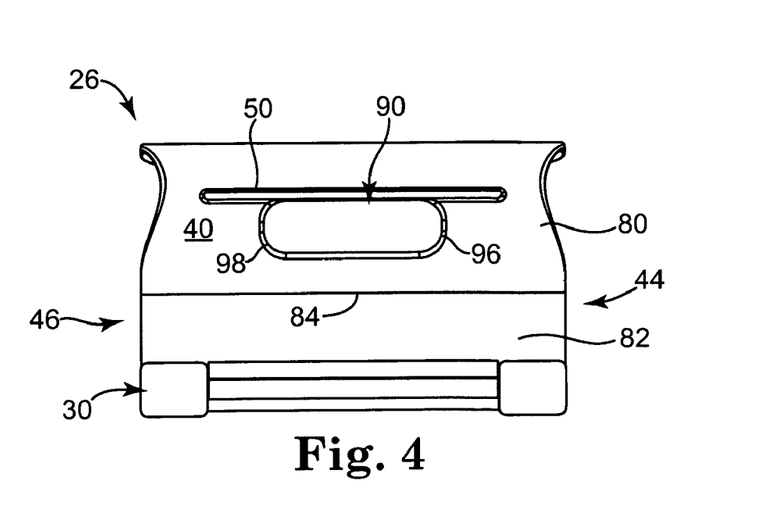
FIG. 4 is a bottom view of the base of FIG. 2, according to an embodiment of the present invention.

FIG. 4 illustrates the base 26 from a bottom view. As will be described in greater detail below, the handle opening 90 is optionally used to grasp the product trolley 22. With reference to FIG. 4, the handle opening 90 is formed through the thickness of the endwall 36. In particular, the handle opening 90 is formed in the toe portion 80 of the endwall 36. The handle opening 90 is elongate and extends widthwise relative to endwall 36 between a first end 96 and a second end 98. Each of the first and second ends 96, 98 is optionally rounded. The handle opening 90 is centered to the width of the endwall 36 and is located proximate the support projection 50. The handle opening 90 defines an overall length of about 4 inches and an overall width of about 1.2 inches, for example. However, other dimensions are contemplated.

In view of the above, the base 26 is constructed such that the first sidewall 32, the second sidewall 34, and the endwall 36 are substantially continuously formed as a single piece. However, separate, connected components are also contemplated. The base 26 is optionally constructed from polyethylene terephthalate (PET), polypropylene (PP), or other polymers, for example. The base 26 or a portion of the base 26 is transparent, translucent, opaque and/or variations thereof. The base 26 is formed using extrusion, injection molding, or other manufacturing methods as desired. The base 26 also optionally includes indicia (not shown), for example printed graphics, labels, raised or depressed lettering, and so forth. The indicia include indicia communicating information about the product 24, indicia communicating methods of using the product trolley 22, and other types of indicia.

The base 26 defines a height of about 3.9 inches from the terminal end 54 of the first sidewall 32 to the lowermost extension of the endwall 36, for example. The grip projection 48 is also located at a height of about 3.9 inches from the lowermost extension of the endwall 36, for example. As will be described below, heights of the terminal end 54 of the first sidewall 32 and the grip projection 48 are optionally matched such that the terminal end 54 and the grip projection 48 are laterally opposed to one another. The base 26 defines a height of about 6.8 inches from the terminal end 62 of the second sidewall 34 to the lowermost extension of the endwall 36, for example. However, it should be understood that other dimensions are also contemplated.

With the above construction in mind, the base 26 is formed to be structurally rigid, yet flexible enough such that the base 26 incorporates some flex action, or spring action, between the first and second sidewalls 32, 34. In particular, the base 26 is manually distensible in a spring-like manner, or otherwise configured such that the first and second sidewalls 32, 34 flex apart to some degree from a natural position, or a full clamp position, to define an expanded position (shown generally for reference in dotted lines in FIG. 2), and naturally flex back, or spring back, to define the natural, or full clamp position. Many optional design factors facilitate the flex action, including, for example, materials selection, geometry of the base 26 (including arcuate shapes of the toe, heel, and transition portions 80, 82, 84), and/or wall thicknesses associated with the base 26. However, the base 26 is optionally substantially rigid or inelastic, as desired.

In one manner of distending the base 26, the terminal end 62 of the first sidewall 32 is pulled, or distended, in a direction D (FIG. 2) away from the second sidewall 34, and in particular the grip projection 48. From the above, it should be understood that the first and second sidewalls 32, 34 are manually and elastically distensible a maximum relative distance without substantial plastic deformation or failure. However, it is also contemplated that the base 26 include deformable, or malleable, materials such that the base 26 is plastically deformed when it is transitioned between the full clamp position and the expanded position.

Figure 5:
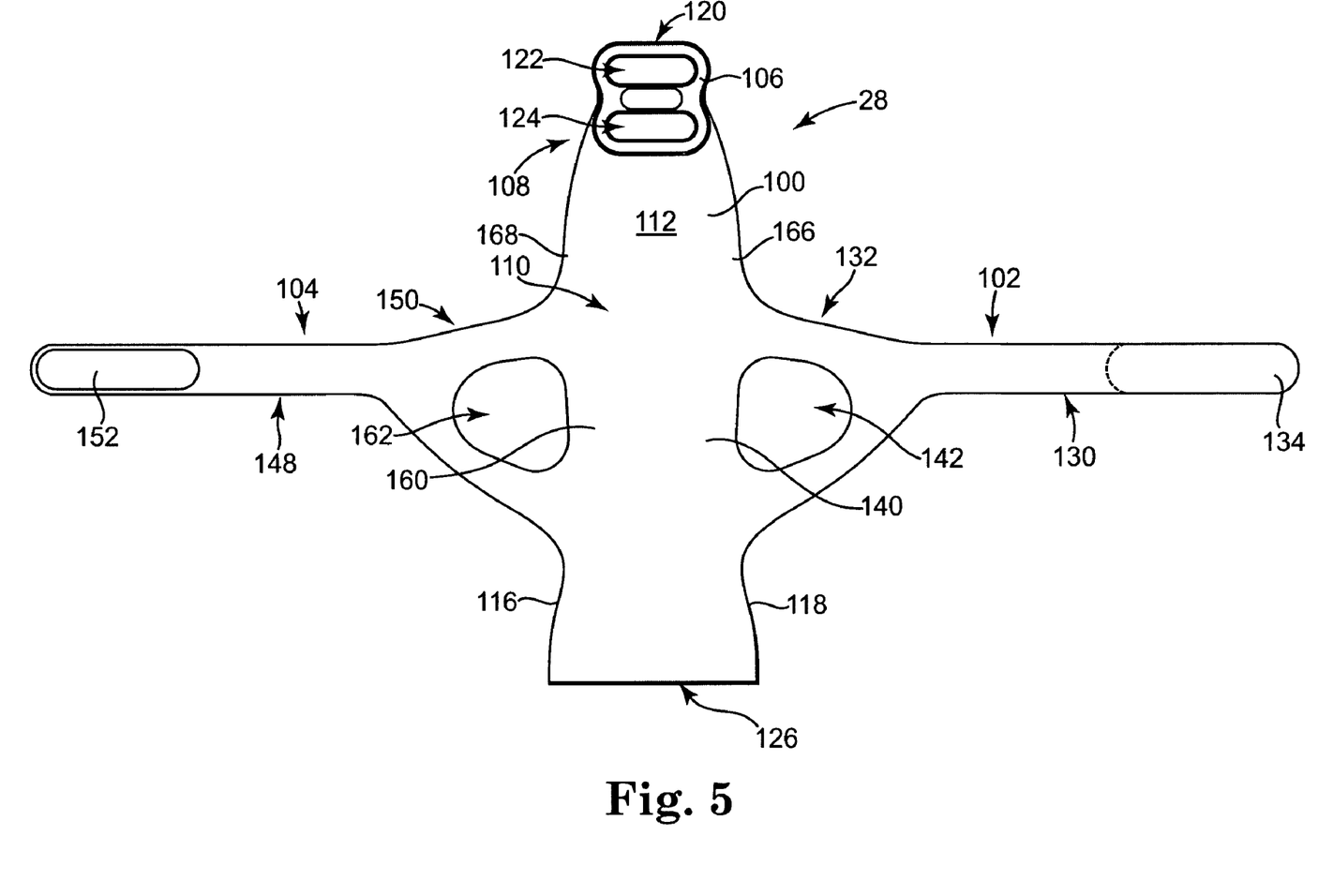
FIG. 5 is a front view of a sling assembly of the product transport system of FIG. 1, according to an embodiment of the present invention.

FIG. 5 illustrates the sling assembly 28 in a flat configuration from a front view. For clarity, the sling assembly 28 is described in association with the flat configuration shown in FIG. 5, unless otherwise shown or indicated. The sling assembly 28 includes a body 100, or a back support member, a first strap 102, or a first wing, a second strap 104, or a second wing, and a handle grip 106. The body 100 is optionally substantially flexible, foldable, and formed of sheet material, but is also substantially inflexible if desired. The body 100 defines an upper portion 108, a lower portion 110, a front face 112, a back face 114 (FIG. 11), a first side 116, and a second side 118.

The upper portion 108 extends opposite the lower portion 110 to a terminal end 120 and forms a first hole 122 and a second hole 124 (obscured by the handle grip 106 in FIG. 5). A portion of the upper portion 108 proximate the terminal end 120 is substantially complementary in shape to the handle grip 106, as shown generally in FIG. 5. As will be understood with reference to the text that follows, the first and second holes 122, 124 are substantially complementary in shape to portions of the handle grip 106. The first hole 122 is located above the second hole 124 with the first and second holes 122, 124 being substantially elongate and extending widthwise relative to the upper portion 108. Each of the first and second holes 122, 124 is about 3.75 inches in width and about 1.2 inches in height, although other dimensions are acceptable. With respect to the lower portion 110, the upper portion 108 tapers in a curved manner, decreasing in width, recurves outwardly, and then tapers again toward the terminal end 120. In this manner, the upper portion 108 optionally defines an hourglass shape.

The lower portion 110 also optionally defines an hourglass shape as generally shown in FIG. 5. The lower portion 110 extends opposite the upper portion 108 to a terminal end 126.

The body 100 is substantially continuously formed as a single piece. However, separate, connected components are also contemplated. The body 100 is formed of such materials as polyethylene terephthalate (PET) or polylactic acid (PA), though other materials are also acceptable. The body 100 or a portion of the body 100 is transparent, translucent, opaque and/or variations thereof. The body 100 is formed using die cutting or other manufacturing methods as desired. The body 100 also optionally includes indicia (not shown), for example printed graphics, labels, and so forth. The indicia include indicia communicating information about the product 24, indicia communicating methods of using the product trolley 22, and other types of indicia.

The body 100 extends for an overall height of about 28.68 inches, for example. The body 100 also has a width at the terminal end 126 of about 9.5 inches, for example, although other dimensions are contemplated. The body 100 is formed of a relatively thin sheet material, for example, although thicker materials are also contemplated.

The first strap 102 is substantially flexible and is optionally formed of sheet material. The first strap 102 defines a band 130 and a transition 132 and optionally includes a first connector 146.

The band 130 extends outwardly from the transition 132 relative to the body 100, and extends to a terminal end 134. The band 130, otherwise described as a belt, is substantially elongate and is adapted to be secured to the second strap 104, as will be described in greater detail below. The band 130 is also optionally rounded at the terminal end as generally shown in FIG. 5. The band 130 defines a height of about 2.2 inches proximate the terminal end 134, for example, although other dimensions are contemplated.

The transition 132 extends opposite the band 130 to the body 100. The transition 132 also defines an interface 140 substantially continuously formed with the body 100. The transition 132 optionally forms a hole 142 inset into an interior of the transition 132. The transition 132 defines an overall height of about 22 inches at the body 100, for example, although other dimensions are contemplated.

The first connector 146 (FIG. 12) provides means for connecting the first strap 102 to the second strap 104. The first connector 146 includes, for example, a portion of a hook and loop fastener (including those sold under the trade name VELCRO®, by Velcro Industries), buttons, clasps, eyelets, adhesives, magnets, and others.

The second strap 104 also defines a band 148 and a transition 150 and includes a second connector 152. The second strap 104 is flexible and optionally formed of sheet material.

The band 148 extends from the transition 150 to the body 100. The band 148 is substantially elongate, and is adapted to be secured to the first strap 102. The band 148 defines a width of about 2.2 inches at the terminal end 154, for example, although other dimensions are contemplated.

The transition 150 is optionally a mirror image of the transition 132 of the first strap 102. Along these lines, the transition 150 extends opposite the band 148, defining a taper in height from the lower body 110 to the second strap 104. The interface 160 substantially continuously connects the second strap 104 to the body 100. Additionally, the transition 150 optionally has a hole 162 inset into an interior of the transition 150.

The second connector 152 is secured to the terminal end 154 of the second strap 102 and is optionally a portion of a hook and loop type fastener capable of being mated with the first connector 146, where securing the first arm 102 to the second arm 104 would include overlapping the first connector 146 and the second connector 152. Alternatively, the second connector 152 is optionally a buckle configured to receive the terminal end 134 of the first strap 102, or other appropriate fastener, where a portion of the first strap 102 is threaded through the buckle and frictionally secured thereto. Thus, the first strap 102 is optionally releasably and/or adjustably secured to the second strap 104. However, it should be noted that other means of releasably and/or adjustably securing the first and second straps 102, 104 to one another are contemplated. For example, other acceptable securing means include buttons, clasps, eyelets, adhesives, magnets, and others.

Each of the first and second straps 102, 104 is substantially continuously formed as a single piece. However, separate, connected components are also contemplated. Each of the first and second straps 102, 104 is formed of such materials as polyethylene terephthalate (PET) or polylactic acid (PA), though other materials are also acceptable. The straps 102, 104 are optionally a substantially similar thickness as the body 100. The first and second straps 102, 104 are transparent, translucent, opaque and/or variations thereof. The first and second straps 102, 104 are formed using die cutting or other manufacturing methods as desired. The first and second straps 102, 104 also optionally include indicia (not shown), for example printed graphics, labels, and so forth. The indicia include indicia communicating information about the product 24, indicia communicating methods of using the product trolley 22, and other types of indicia.

As shown generally in FIG. 5, the first and second straps 102, 104 are substantially continuously formed with the body 100. However, the interface 140 is optionally overlapped onto the body 100, for example onto the back face 114 of the body 100, proximate the first side 116 of the body 100 and secured thereto via a variety of means, including ultrasonic welds, stitching, adhesives, thermal welds, RF welds, and others, for example. However, as shown in FIG. 5, the first strap 102 is continuously formed with the body 100 such that the body 100 and the first strap 102 are a single piece. Regardless, the first strap 102 and the body 100 define an upper junction 166 at an uppermost point where the first strap 102 intersects with the body 100.

The second strap 104 is optionally connected to the second side 118 of the body 100 in a substantially similar manner as the first strap 102. Thus, the second strap 104 and the body 100 are optionally substantially continuously formed, as described above in association with the first strap 102. So connected, the second strap 104 and the body 100 intersect to define an upper junction 168 at an uppermost point where the second strap 104 intersects with the body 100. The upper junctions 166, 168 are located at a height of about 21.7 inches from the terminal end 126, for example, although other dimensions are contemplated.

Figure 6:
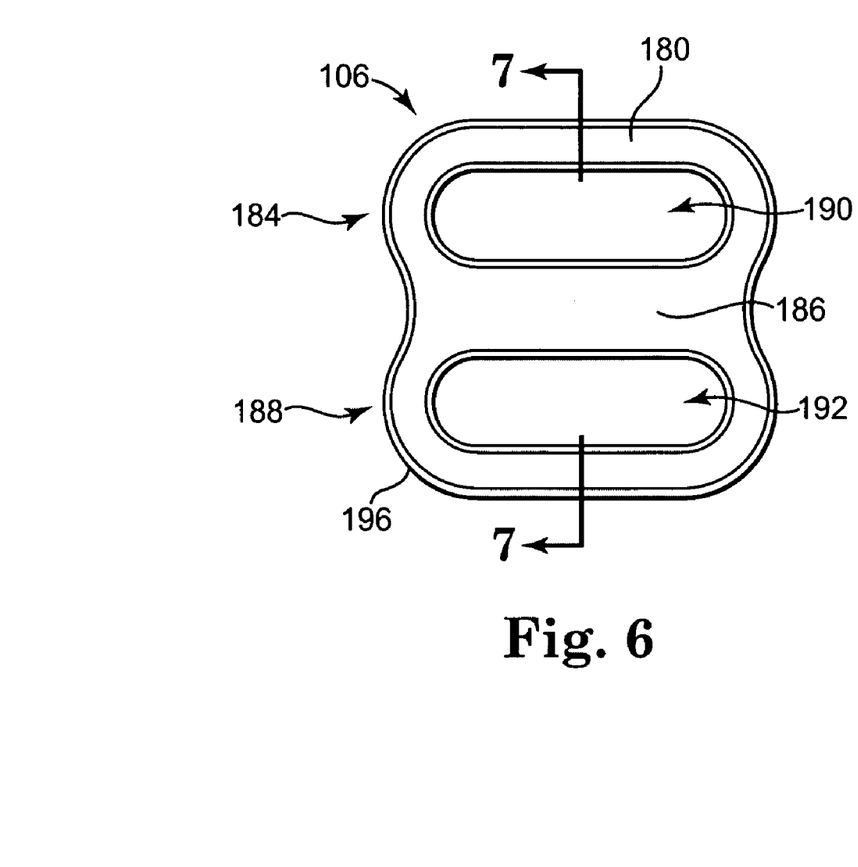
FIG. 6 is a front view of a grip of the product transport system of FIG. 1, according to an embodiment of the present invention.
Figure 7:
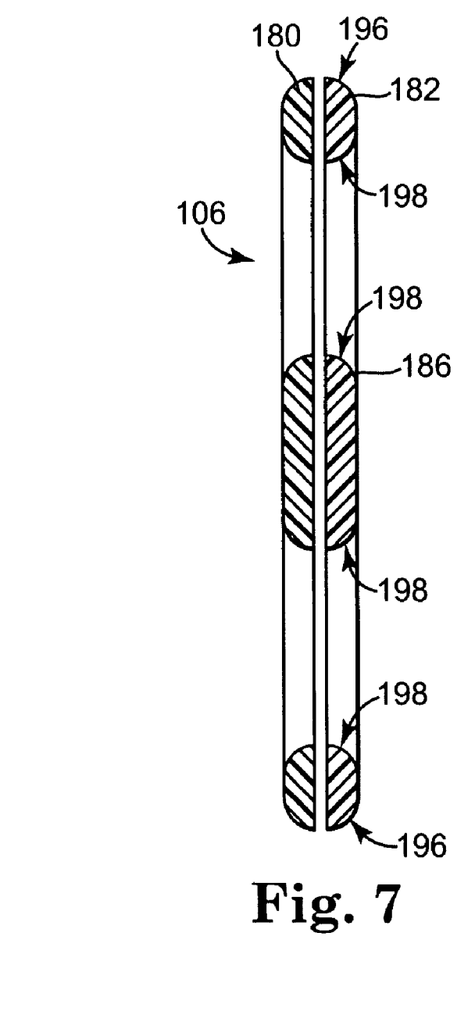
FIG. 7 is a side, cross-sectional view of the grip of FIG. 6, according to an embodiment of the present invention.

FIG. 6 illustrates the handle grip 106 from a front view. With reference to FIG. 6, the handle grip 106 defines an upper grip portion 184, a mid portion 186, and a lower grip portion 188. Overall the handle grip 106 forms a substantially hourglass shape, or figure-eight shape. In particular, and as described above, the handle grip 106 defines a substantially complementary shape to the upper portion 108 of the body 100. FIG. 7 is a side view of the handle grip 106 along a central cross-section. With reference to FIG. 7, the handle grip 106 is optionally formed from a combination of a front portion 180 and a back portion 182.

The upper grip portion 184 has a first hand opening 190, while the lower grip portion 188 has a substantially similar, second hand opening 192. The first and second hand openings 190, 192 are substantially similar, and complementary in shape to the first and second holes 122, 124 of the body 100, respectively.

Returning to FIG. 7, the handle grip 106 optionally has rounded-off edges, to facilitate a more comfortable hand grip. In particular, an outer perimeter 196 of the handle grip 106 is rounded. Additionally, internal surfaces 198 of the handle grip 106 at the first and second openings 190, 192 are also rounded.

Figure 11:
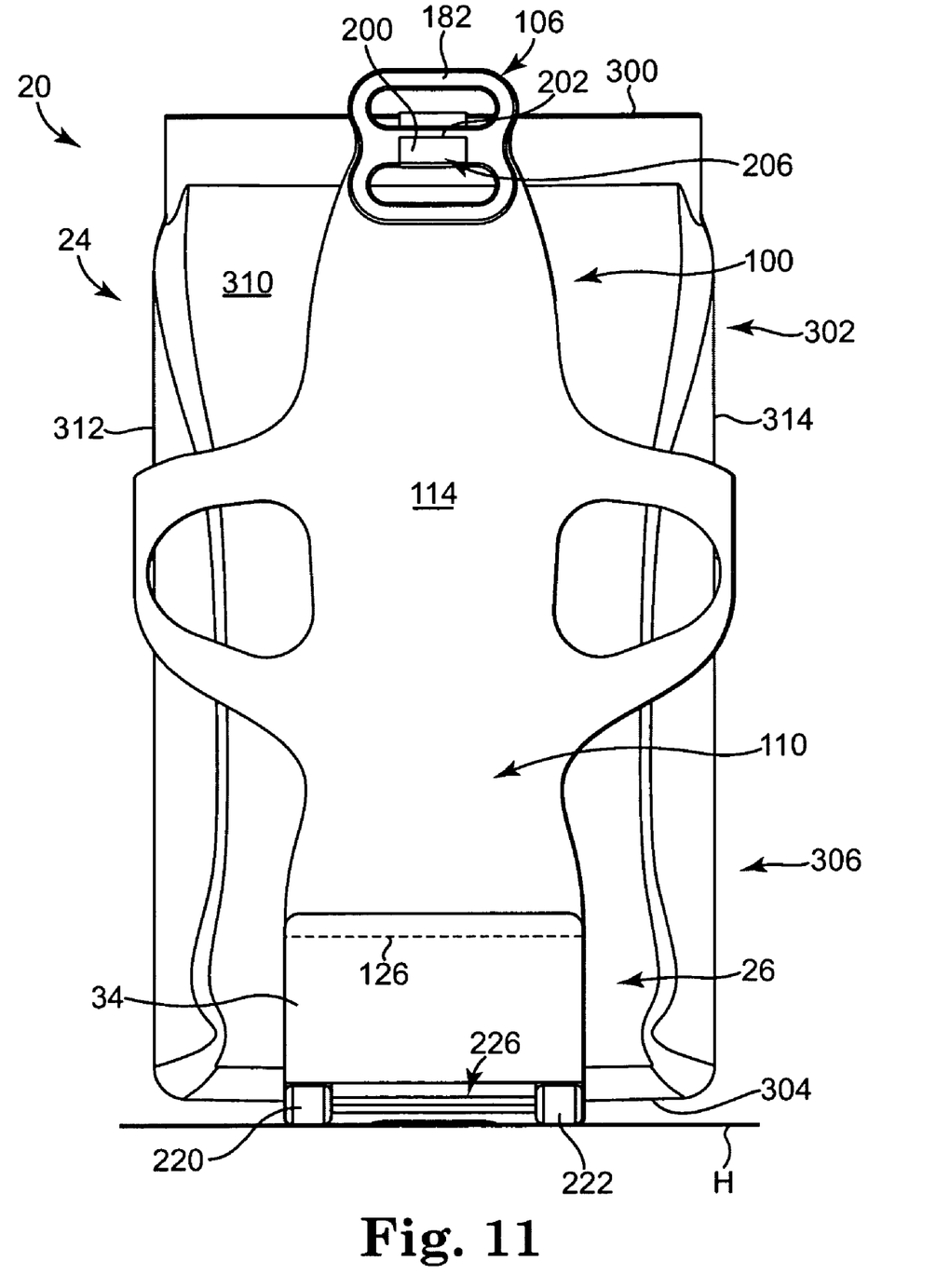
FIG. 11 is a back view of the product transport system of FIG. 1, according to an embodiment of the present invention.
Figure 12:
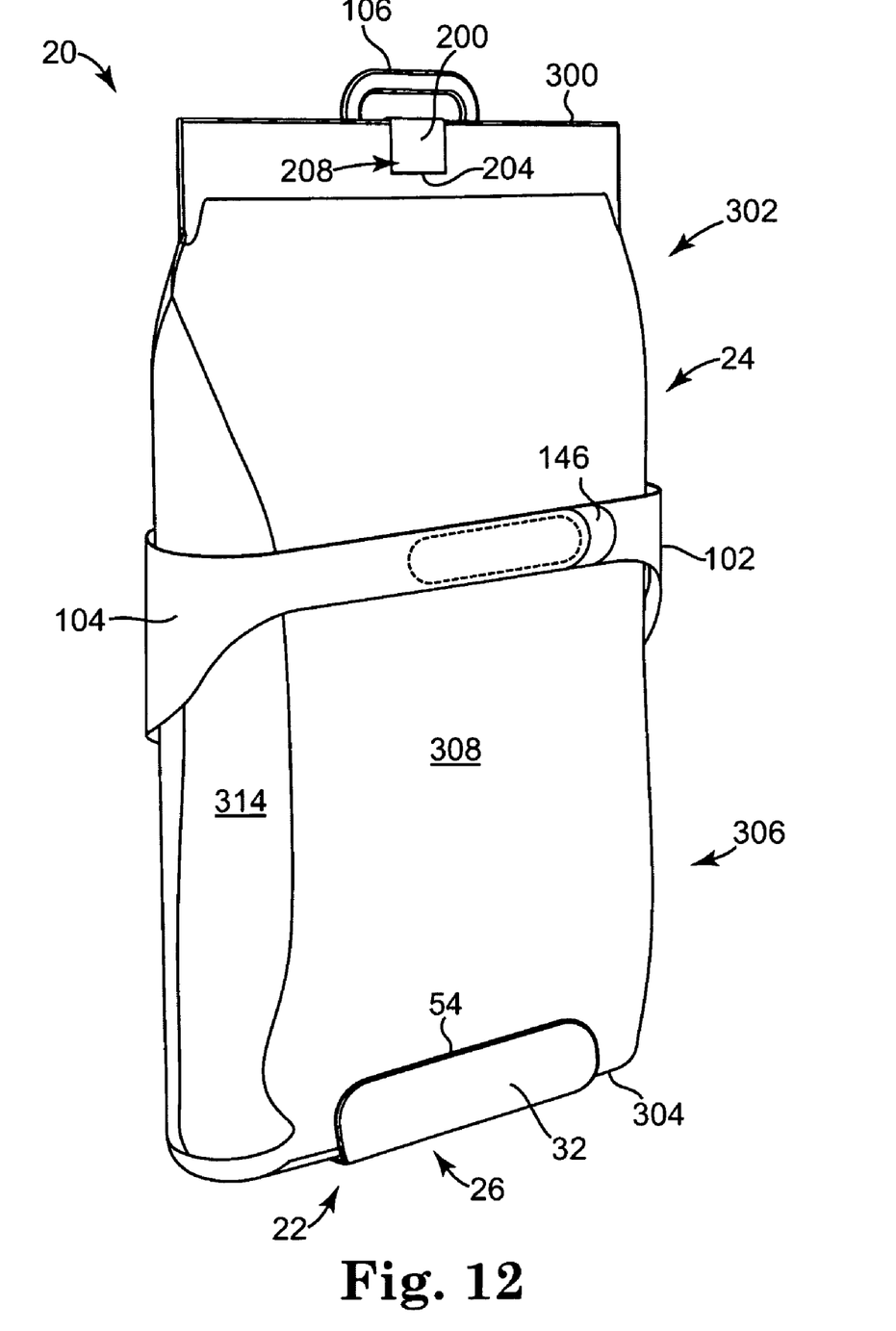
FIG. 12 is a front, perspective view of the product transport system of FIG. 1, according to an embodiment of the present invention.

With reference to FIGS. 11 and 12, the handle grip 106 optionally includes a product fastener 200 for attaching the handle grip 106 to the product 24. The product fastener 200 defines a first end 202, a second end 204, a first face 206, and a second face 208. The product fastener 200 is optionally an adhesive label, or sticker, including a substrate (not shown) and adhesive (not shown) formed onto at least one of the first and second faces 206, 208. The substrate is optionally formed of a variety of materials including, for example, polymeric or paper sheet products, while the adhesive is optionally selected from a variety of adhesives including, for example, pressure sensitive adhesives.

The product fastener 200 is secured, for example adhered, to both the mid portion 186 of the product fastener 200 and a portion of the product 24. However, other product fasteners are also contemplated, for example metal or plastic clips adapted to fit over, and frictionally engage the mid portion 186 (FIG. 6) of the handle grip 106 and the product 24. Regardless, the product fastener 200 serves as an optional fastening means between the product 24 and the handle grip 106. The product fastener 200 is optionally adapted to be manually torn to unfasten the handle grip 106 from the product 24. For example, the product fastener 200 is optionally formed of a material that is characterized as hand-tearable, or the product fastener 200 optionally includes such features as perforations (not shown) to facilitate tearing of the product fastener 200.

With reference to FIG. 5, the handle grip 106 is assembled with the front portion 180 against the front face 112 of the body 100. With reference to FIG. 11, the back portion 182 is secured against the back face 114 of the body 100. In particular, the first and second hand openings 190, 192 of the handle grip 106 are aligned to the first and second holes 122, 124 of the body 100, respectively. In this manner, the fingers and/or palm of a user (not shown) is optionally fit into either of the first or second hand openings 190, 192 and through the first and second holes 122, 124.

The handle grip 106 is optionally secured to the body 100 by clamping part of the upper portion 108 proximate the first and second holes 122, 124 between the front and back portions 180, 182 (FIG. 11) of the handle grip 106. The handle grip 106 is optionally secured to the body 100 with rivets, adhesives, heat welds, ultrasonic welds, magnets, snap fits, and other fastening means. Regardless, the handle grip 106 is adapted to be disposed about the first and second holes 122, 124 such that a user placing a hand into either of the holes 122, 124 grasps the handle grip 106.

The handle grip 106 is optionally constructed from polyethylene terephthalate (PET) or polypropylene (PP), though other materials are contemplated. It is contemplated that the handle grip 106 or a portion of the handle grip 106 is either flexible or inflexible as desired. The handle grip 106 or a portion of the handle grip 106 is transparent, translucent, opaque and/or variations thereof. The handle grip 106 is formed using extrusion, injection molding, or other manufacturing methods as desired. The handle grip 106 also optionally includes indicia (not shown), for example printed graphics, labels, raised lettering, and so forth. The indicia include indicia communicating information about the product 24, indicia communicating methods of using the product trolley 22, and other types of indicia.

Each of the first and second hand openings 190, 192 defines a width of about 3.75 inches and a height of about 1.2 inches, for example. Additionally, the handle grip 106 defines an overall height of about 4.6 inches. Other dimensions are also contemplated.

Figure 8:
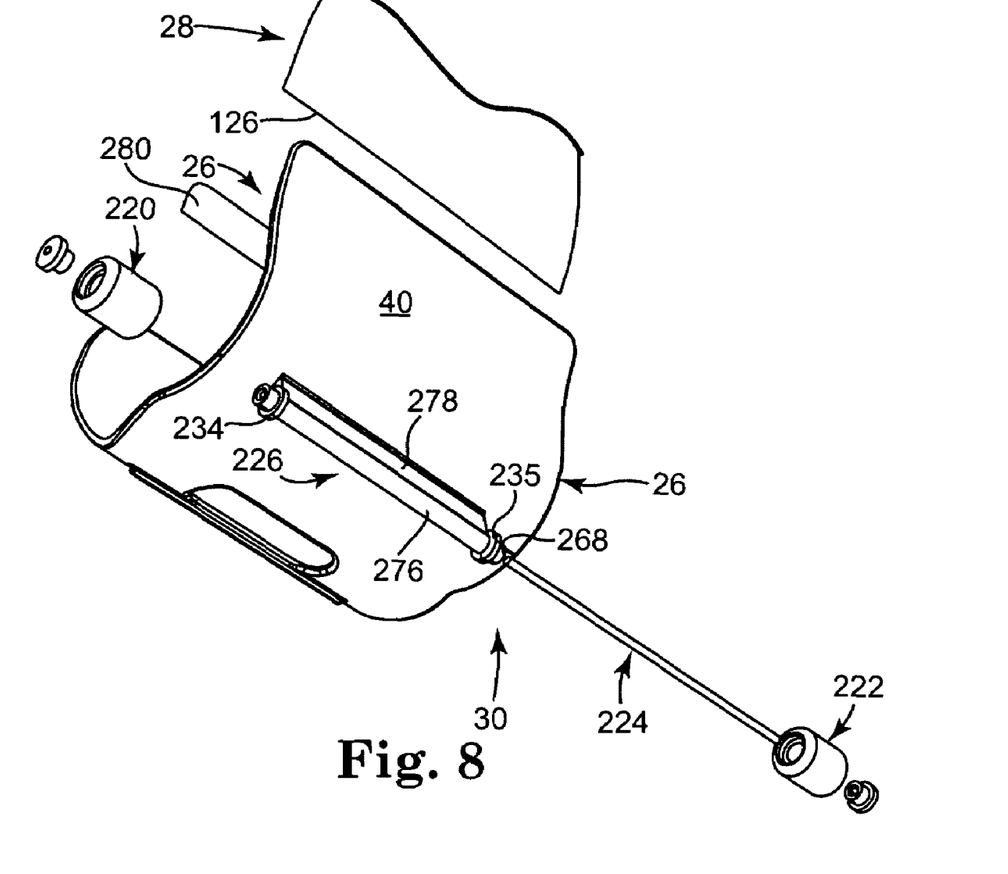
FIG. 8 is a back, perspective view of a portion of the product transport system of FIG. 1, according to an embodiment of the present invention.

FIG. 8 illustrates the roller assembly 30 in a partially assembled state. With reference to FIG. 8, the roller assembly 30 includes a first wheel 220, a second wheel 222, an axle 224, and an axle guide 226.

The first and second wheels 220, 222 are optionally substantially similar, and thus, are discussed cumulatively with reference to the first wheel 220. The first wheel 220 includes a body 230, and a wheel hub 232. The first wheel 220 also optionally includes an outer coating (not shown), for example a rubberized coating.

Figure 9:
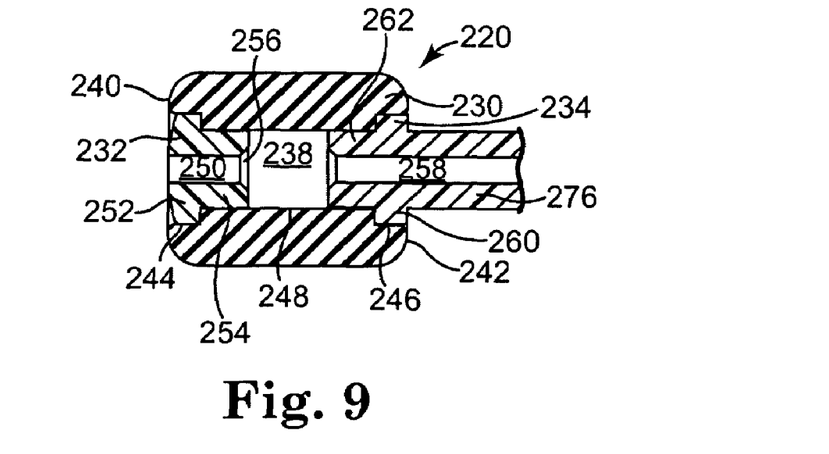
FIG. 9 is a cross-sectional view of a wheel of the product transport system of FIG. 1, according to an embodiment of the present invention.

FIG. 9 illustrates the first wheel 220 and a portion of the axle guide 226 from a centrally located, front, and cross-sectional view. With reference to FIG. 9, the body 230 is substantially cylindrical in shape, forms an internal lumen 238, and extends from a first end 240 to a second end 242. The internal lumen 238 is optionally stepped in diameter, to define a first hub seat 244 proximate the first end 240, a second hub seat 246 proximate the second end 242, and a central portion 248 between the first and second hub seats 244, 246. In particular, the body 230 defines a larger internal diameter at the first and second hub seats 244, 246 relative to the central portion of the internal lumen 238.

The body 230 defines an outer diameter of about 1.25 inches, an inner diameter of about 0.75 inches at the first and second hub seats 244, 246, and an internal diameter of about 0.5 inches at the central portion 248, for example. Additionally, the first and second ends 240, 242 of the body 230 are optionally rounded off. For example, the outer edges 240, 242 define a radius of about 0.2 inches. However, other dimensions are contemplated.

The wheel hub 232 forms an inner lumen 250 and defines a collar 252 and a base 254. The inner lumen 250 terminates at a flared end 256. The collar 252 is substantially complementary in size and shape to the first hub seat 244. In turn, the base 254 is substantially complementary in size and shape to the central portion 248 of the internal lumen 238.

The collar 252 defines a diameter of about 0.74 inches and a width of about 0.2 inches; the base 254 defines diameter of about 0.49 inches and a width of about 0.3 inches; and the inner lumen 250 is about 0.19 inches in diameter, for example. It should be understood that other dimensions are also contemplated. The various components the first and second wheels 220, 222 are optionally constructed from polyethylene terephthalate (PET) or polypropylene (PP). However, other materials are also suitable depending on a particular application.

With reference back to FIG. 8, the axle 224 is a substantially elongate and solid cylinder extending from a first end 268 to a second end. As referenced above, the first end 268 of the axle 224 is configured to be coaxially received in the inner lumen 250 of the hub 232. In particular, the axle 224 is sized and shaped to form an interference fit in the lumens 250 of the wheel hub 232. The axle 224 is also sized and shaped to form an interference fit with the second wheel 222 in a similar manner. The axle 224 is formed of metal, for example steel. However, it is also contemplated that the axle 224 be formed of other materials, such as polymeric materials, for example.

The axle guide 226 is substantially continuously formed with the base 26 as a single piece. As such, the axle guide 226 is optionally formed of similar materials, and via similar means as the base 26.

The axle guide 226 includes a tubular portion 276 and a connector portion 278. The tubular portion 276 is cylindrical in shape, having an inner lumen 258 formed through an entire length of the tubular portion 276. The inner lumen 258 is sized and shaped to coaxially receive the axle 224 in an interference fit such that the axle 224 is rotationally fixed in the inner lumen 258. However, it is also contemplated that the axle 224 optionally rotates in the inner lumen of the tubular portion 276. The tubular portion 276 defines an internal diameter of about 0.2 inches and an external diameter of about 0.5 inches, for example. The tubular portion 276 also defines a width of about 6.5 inches, for example. It should be understood that other dimensions are also contemplated.

The tubular portion 276 forms a first guide hub 234 and a second guide hub 235 at opposite ends of the tubular portion 276. The first guide hub 234 forms part of inner lumen 258 and defines a collar 260 and a base 262. The inner lumen 258 is adapted to coaxially receive a portion of the axle 224. The collar 260 is complementary in size and shape to the second hub seat 244 of the first wheel 220. Additionally, the base 262 is substantially complementary in size and shape to the central portion 248 of the first wheel internal lumen 238.

The connector portion 278 extends angularly from the base 26 and is substantially rectangular in shape, for example, and optionally tapers in thickness from the base 26. Other shapes and dimensions are also contemplated.

The tubular portion 276 and the connector portion 278 are substantially continuously formed as a single piece. However, separate, connected components are also contemplated. In relational terms, the connector portion 278 extends radially from the tubular portion 276. From the above, it should be understood that part of the tubular portion 276 and the connector portion 278 are optionally aligned and extend similar lengths such that the tubular portion 276 and the connector portion 278 are substantially coterminous, with the first and second guide hubs 234, 235 of the tubular portion 276 extending beyond the connector portion 278.

With reference between FIGS. 8 and 9, the roller assembly 30 is assembled by coaxially inserting the axle 224 into the tubular portion 276 of the axle guide 226 such that the axle 224 is rotationally fixed relative to the axle guide 226. The first wheel 220 is seated on the first guide hub 234 and the wheel hub 232 of the first wheel 220 is then pressed onto the first end 268 of the axle 224. With the assembly described above, the hubs 232, 234, in turn, are optionally rotationally fixed relative to the axle 224. However, the body 230 of the first wheel 220 is free to rotate about the hubs 232, 234. As mentioned, the second wheel 222 also rotates about hubs (not shown) in a similar manner. However, while the first and second wheels 220, 222 have been described as rotating about hubs, it is also contemplated that the first and second wheels 220, 222 are optionally rotationally fixed relative to the axle 224 or that the bodies of the first and second wheels 220, 222 are secured to, and rotate about, to the axle 224 without use of distinct hubs, as well as other roller means as desired.

In view of the above, an embodiment assembly of the base 26, the sling assembly 28, and the roller assembly 30 is described. With reference to FIGS. 9, 10, and 11, the sling assembly 28, and in particular the terminal end 126 (shown in FIG. 5 and shown generally by dotted lines in FIG. 11) of the body 100 is attached to the base 26 at the handle seat 64 (FIG. 2). The terminal end 126 is optionally attached to the base 26 at the handle seat 64 via a variety of means. For example, the terminal end 126 is optionally riveted to the base 26 with a plurality of rivets (not shown). As another example, a strip of adhesive 280 is optionally employed to secure the body 100 to the base 26.

Regardless, the body 100 is aligned to the width of the base 26 such that the body 100 optionally extends orthogonally relative to the endwall 36 (FIG. 2) of the base 26. As aligned, the terminal end 126 and some of the lower portion 110 are received against the handle seat 64 and the adhesive 280 if applicable. The body 100 proximate the terminal end 126 is substantially matched to the step in thickness at the handle seat 64 such that the inner surface 38 (FIG. 2) of the base 26 transitions more smoothly to the body 100 with a more continuous profile. As alluded to above, it is contemplated that the body 100 is secured to the base 26 at the handle seat 64 with any of a variety of means depending upon material and/or product requirements. Such means include rivets, ultrasonic welding, adhesives, thermal welding, hook and loop fasteners, and others as appropriate.

As alluded to above, the roller assembly 30, and in particular, the connector portion 278 (FIG. 8) of the axle guide 226, is substantially continuously formed with the base 26. With this in mind, the connector portion 278 extends radially from the arcuate side profile of the heel portion 82 of the endwall 36. In particular, the connector portion 278 extends at an angle of about 45 degrees from the outer surface 40 of the base 26 relative to the horizontal plane H (FIG. 10), although other angles are also acceptable. Additionally, the connector portion 278 is substantially centered relative to the width of the base 26. So disposed, the first and second wheels 220, 222 of the roller assembly 30 do not substantially protrude outwardly relative to the width of the base 26 when viewing the product trolley 22 from a back side (FIG. 11). Additionally, with the assembly described, the first and second wheels 220, 222 are optionally positioned in the recess 94 (FIG. 2) defined by the heel portion 82 of the base 26. So disposed, an outer transverse profile of the first and second wheels 220, 222 is optionally substantially aligned along a horizontal plane H when the base 26 is supported substantially upright with the roller assembly 30, support surface 92 of the toe portion 80 and/or the support projection 50 of the base 26. In this manner, the roller assembly 30 optionally defines a substantially minimized profile relative to the base 26. Additionally, and as described, when acting in conjunction with the support surface 92 and/or support projection 50, the roller assembly 30 is adapted to support the product trolley 22 in an upright, or substantially vertical, position as shown in FIGS. 10 and 11.

In view of the above, the product 24 is optionally assembled to the product trolley 22 as described below. By way of background, and with reference to FIGS. 10, 11, and 12, the product 24 defines a proximal end 300, or top end, an upper portion 302, or top portion, a distal end 304, or bottom end, a lower portion 306, or bottom portion, a front 308, a back 310, a first side 312, and a second side 314. The product 24 is optionally a hermetically sealed sack containing a food item, for example an aggregate product such as dog food; however, other products maintaining other types of items are also contemplated, including other hermetic or non-hermetic bags or boxes holding non-aggregate or aggregate items. Examples of other products include, but are not limited to, rock salt, ice (e.g., cubed or block), kitty litter, garden soil, charcoal, rice, and beans, for example.

The product 24 optionally weighs at least about 5 lbs, more particularly from about 10 lbs to about 100 lbs, and even more particularly from about 30 lbs to about 50 lbs, although other weights are contemplated, including combinations of any of the ranges or weight values expressly described, for example about 10 lbs to about 50 lbs.

As described above, the first and second sidewalls 32, 34 are optionally distended from one another by flexing the first sidewall 32 away from the second sidewall 34. The user optionally expands the opposing first and second sidewalls 32, 34 by hand, or the distal end 304 of the product is inserted into the base 26 to force the sidewalls 32, 34 apart.

The product 24 is optionally maintained by the product trolley 22 with the lower portion 306 of the product 24 received in the base 26, for example with the distal end 304 of the product 24 optionally resting against the endwall 36, and in particular against the heel portion 82. With this arrangement, the base 26 provides sufficient room to insert the fingers and/or palm of the user into the handle opening 90 (FIG. 4) without the handle opening 90 being obstructed by the distal end 304 of the product 24. In turn, the upper portion 302 of the product 24 projects proximally from the top opening 42 (FIG. 2) of the base 26. Products having various heights are securable in the product trolley 22 as the product 24 is able to protrude from the top opening 42. Additionally, products having various widths are securable in the product trolley 22, as the product 24 is able to protrude from the first and second open ends 44, 46 of the base 26.

With the product 24 disposed in the base 26, the springiness, or flex action, of the base 26 causes the base to compress against the lower portion 306 of the product 24. In particular, at least the terminal end 54 of the first sidewall 32 and the grip projection 48 formed by the second sidewall 34 engage the product 24. In some embodiments, the product 24 is compressively engaged between the first and second sidewalls 32, 34 to releasably retain the product 24 in the base 26. Additionally, adhesives or other fastening means are optionally used in addition, or as an alternative to compressive engagement, to secure the product 24 into the base 26. For example, adhesive is optionally placed between the inner surface 38 of the base 26 and the lower portion 306 of the product.

With the lower portion 306 received in the base 26, the body 100 is extended along the back 310 of the product 24 and toward the proximal end 300 of the product 24. In some embodiments, the flexibility, or compliance, of the body 100 allows the body 100 to substantially conform to, or follow a contour of, at least a portion the back 310 of the product 24. With the body 100 disposed along the back 310, the first strap 102 of the sling assembly 28 is wrapped about the first side 312 of the product 24 to the front 308 of the product 24. The second strap 104 is wrapped about the second side 314 of the product 24 to the front of the product 24 with the connector 152 optionally residing on the front 308 of the product 24. Regardless of the position of the connector 152, the first and second straps 102, 104 are secured to one another with the connectors 146, 152 tightly about the product 24. Optionally, the product fastener 200 is secured to the proximal end 300 of the product 24 and the handle grip 106. With the addition of the product fastener 200, the handle grip 106 is directly secured to the product 24, as well as indirectly secured to the product 24 via the body 100 and the first and second straps 102, 104.

It should also be understood that the product 24 is removable from the base 26. In particular, the product 24 is optionally disassembled from the base 26 by disconnecting the first and second straps 102, 104 to loosen the straps 102, 104 from the product 24, removing the product fastener 200 from the product 24, distending the first and second sidewalls 32, 34 of the base 26 where the base 26 incorporates a flex action, and removing the product 24 from the base 26.

Figure 13:
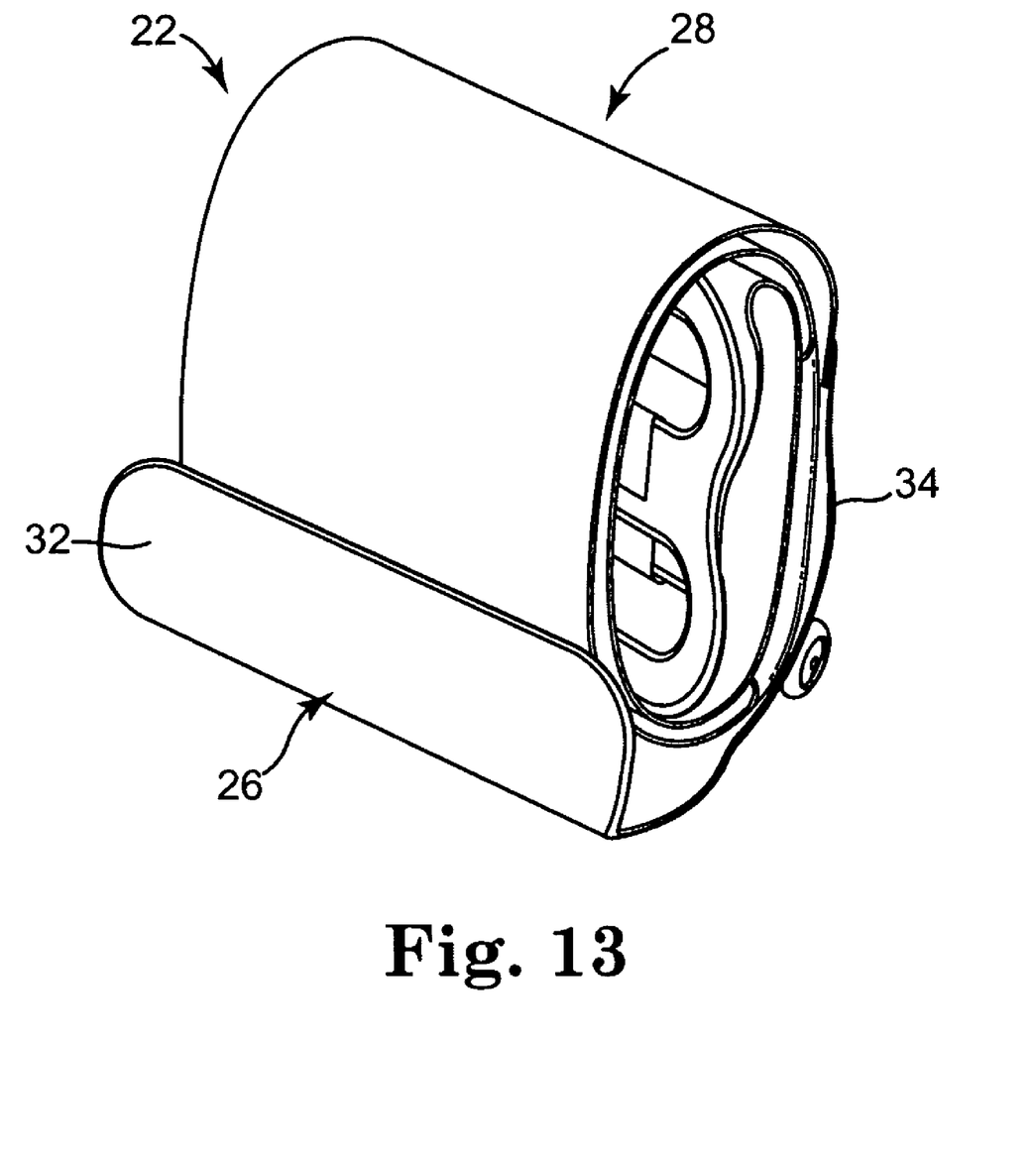
FIG. 13 is a perspective view of a product trolley in a collapsed state, according to an embodiment of the present invention.

Furthermore, it should be understood that the substantially flexible and foldable design of the body 100 and the first and second straps 102, 104 allows the sling assembly 28 to be collapsed and folded into the base 26. For example, as shown in FIG. 13, the first and second straps 102, 104 (FIG. 5) are adapted to be folded, or collapsed, inwardly onto the body 100. The handle grip 106 is then rolled up with the body 100 and the first and second straps 102, 104 into the base 26. In this manner, the sling assembly 28 is optionally foldable, or collapsed, into the base 26 to transition the product trolley 22 to a compact state.

In light of the above, one method of transporting the product 24 with the product trolley 22 includes releasably securing the product 24 to the product trolley 22, placing the product trolley 22 and the product 24 on a substantially horizontal surface, supporting the product trolley 22 and the product 24 on the roller assembly 30 of the product trolley 22, rolling the product trolley 22 on the roller assembly 30, removing the product 24 from the product trolley 22, and folding the sling assembly 28 into the base 26 of the product trolley 22.

In some embodiments, the product trolley 22 and the associated product 24 secured thereto are stacked at a display and/or storage location (not shown). The product 24 and the product trolley 22 are optionally displayed in an assembled form, or in a disassembled form at a display and/or storage location. The product 24 and product trolley 22 are optionally displayed at a store shelf, an endcap, or a free-standing display, for example. The product 24, or a plurality of products, is optionally displayed next to the product trolley 22, or a plurality of product trolleys. For example, where the product 24 is a sack of dog food, the product trolley 22 is optionally introduced to a consumer in a retail environment proximate where the sack or sacks of dog food are presented to the consumer. In particular, the sack of dog food is optionally displayed assembled to the product trolley 22, for example in a stacked arrangement, or is optionally displayed in a disassembled state from the product trolley 22, for example with a stack of dog food bags displayed next to the plurality of product trolleys.

Whether assembled at a display location, at a manufacturing location, at a home of a purchaser, or elsewhere, the product transport system 20 is usable to roll the product 24 to a desired location. With at least one hand, the user grasps one or more of the handle opening 90 in the base 26, the first and second straps 102, 104 of the sling assembly 28, or the handle grip 106 to place the product trolley 22 on the horizontal surface (not shown). In particular, the product trolley 22, and therefore the product 24, is supported on the toe portion 80, and in particular, the support surface 92; the support projection 50 of the base 26; and the first and second wheels 220, 222 of the roller assembly 30 on the substantially horizontal surface. The support projection 50 of the base 26 helps prevent the product trolley 22 and product 24 from falling forward as the support projection 50 is angled and in a forward position relative to the support surface 92. Regardless, the product trolley 22 and the product 24 are supported in a substantially vertical fashion relative to the surface on which the product trolley 22 is resting.

The user then tips the product trolley 22 backward onto the first and second wheels 220, 222 of the roller assembly 30, such that the weight of the product 24 (as well as that of the product trolley 22) is supported on the first and second wheels 220, 222. In a tipped position, the sling assembly 28, including the flexible body 100, acts in a sling-like manner to support the back 310 of the product 24 and therefore a portion of the weight of the product.

When tipping the product trolley 22 and the product 24 backward, the outwardly tapering transitions 132, 150 (FIG. 5) of the sling assembly 28 assist in translating force applied to the handle grip 106 to the first and second straps 102, 104. In particular, the position of the uppermost junctions 166, 168 assist in translating force on the handle grip 106, which is located proximate the proximal end 300 of the product 24, to a more central part of the product 24. This feature is useful to reduce force on the product fastener 200, or when there is no product fastener 200, to translate force on the handle grip 106 downward to the first and second straps 102, 104. Additionally, the position of the straps 102, 104 being more toward the proximal end 300 than the distal end 304 of the product 24 also assists in tipping and/or pulling backward on the product 24 with the handle grip 106.

The user grasps and pulls on the handle grip 106 with the hand of the user. For example, shorter users optionally grasp the handle grip 106 at the second hand opening 192 while taller users optionally grasp the first hand opening 190. In this manner, the handle grip 106 is adapted for people of various heights, without the need to substantially adjust or move the sling assembly 28. The product trolley 22 and the associated product 24 are rolled on the first and second wheels 220, 222 across the horizontal surface and/or other surfaces (not shown) to the desired location with the sling assembly 28 supporting a portion of the weight of the product 24. Finally, the product 24 is removed from the product trolley 22 as previously described. Then the sling assembly 28 is folded onto itself and into the base 26 along with a remainder of the sling assembly 28 for storage as shown in FIG. 13. In particular, the first and second straps 102, 104 are optionally folded, rolled, or collapsed inwardly toward the body 100 and the body is then compressed, rolled up, or otherwise folded into the base 26. At some later time, the user optionally unfolds the sling assembly 28 from the base 26, and releasably secures the product trolley 22 to another product (not shown).

In view of the above, embodiments of the present invention achieve a variety of advantages. For example, the product trolley 22 allows the user to roll relatively heavy and/or large items through various environments without having to carry the items. The product trolley 22 is displayable in an assembled form with the product 24, or in a disassembled form next to the product 24 or in an entirely different location. The product trolley 22 also provides several grasping locations for moving the product 24, including at base 26, the handle grip 106, and the first and second straps 102, 104. The roller assembly 30 optionally incorporates a "low profile" design, such that the first and second wheels 220, 222 do not protrude beyond outer profiles of the base 26. This feature allows superior stackability and storage of the product trolley 22, both when assembled and when disassembled from the product 24. The product trolley 22 is sufficiently cost effective to be provided with the product 24 in retail environment and is optionally discarded, but is also optionally designed for reuse. In particular, the durable construction of the product trolley 22, along with the ability to release and resecure the product 24, allows multiple uses. Additionally, the open-ended design of the base 26 allows potential use of the product trolley 22 with a variety of different product formats. The product trolley 22 is storable in an ultra-compact configuration as the sling assembly 28 is foldable into the base 26.

The product trolley 22 is usable in a variety of environments; for example, it is contemplated that the product trolley 22 be used to display or move products found in a retail environment, for example relatively large and heavy products such as sacks of aggregate, including dog food, rock salt, kitty litter, charcoal, rice, beans, ice, and garden soils, for example. In some embodiments, the product trolley 22 is used to move the product 24 from a display location, for example a shelf or end cap in a retail store, down one or more shopping aisles, to a point of sale, out of a retail environment, to a vehicle, and/or into a residence.

Although the invention has been described with respect to particular embodiments, such embodiments are for illustrative purposes only and should not be construed to limit the invention. Various alternatives and changes will be apparent to those of ordinary skill in the art. For example, although disclosed above as being formed in a particular shape or of a particular size, other suitable shapes and sizes of product trolleys are also contemplated. Other modifications within the scope of the invention and its various embodiments will be apparent to those of ordinary skill.

What is claimed is:

1. A product trolley comprising:
   a base including a first sidewall, a second sidewall opposing the first sidewall, and an endwall extending between the first and second sidewalls, the base defining an inner surface, a first open end, a second open end opposite the first open end, and a top opening opposite the endwall;
   a sling assembly secured to the base, the sling assembly including a body extendable along a back of a product; and
   a roller assembly secured to the base proximate to a transition between the first sidewall and the end the endwall;
   wherein the base includes a spring action between the first sidewall and the second sidewall, such that the base is configured to be flexed to receive and releasably secure the product between the first and the second sidewalls, and wherein the base includes a support surface proximate to a transition between the second sidewall and the endwall, the support surface defining a lowermost extension of the endwall that is cooperable with the roller assembly to support the product trolley on a substantially horizontal surface.

2. The product trolley of claim 1, wherein the body of the sling assembly is substantially continuously formed as a single piece and is foldable into the base of the product trolley to transition the product trolley to a compact state.

3. The product trolley of claim 1, wherein the first sidewall extends to a terminal end, the first sidewall extending toward the second sidewall at the terminal end.

4. The product trolley of claim 1, wherein the second sidewall forms a grip projection extending from the inner surface of the base toward the first sidewall, the grip projection formed widthwise along the second sidewall.

5. The product trolley of claim 4, wherein the first sidewall extends to a terminal end, and further wherein the terminal end of the first sidewall and the grip projection of the second sidewall are positioned such that the terminal end is laterally opposed to the grip projection.

6. The product trolley of claim 1, wherein the endwall forms a toe portion proximate the first sidewall and a heel portion proximate the second sidewall, wherein the toe portion protrudes distally opposite the top opening more than the heel portion projects distally opposite the top opening.

7. The product trolley of claim 1, wherein the body of the sling assembly defines an upper portion and a lower portion, wherein the upper portion has an opening adapted to receive a hand, wherein the lower portion of the body is secured to the base.

8. The product trolley of claim 7, wherein the body of the sling assembly defines a first side and a second side, the first side opposing the second side, and further wherein the sling assembly further comprises:

a first strap connected to the first side of the body and a second strap connected to the second side of the body, each of the first and second straps being substantially flexible and adapted to be wrapped about the product;

wherein at least one of the first and second straps includes a connector for securing the first strap to the second strap.

9. The product trolley of claim 1, wherein the roller assembly comprises:

an axle guide having an inner lumen extending through the axle guide, the axle guide projecting from the base;

an axle coaxially received in the axle guide, the axle defining a first end and a second end;

a first wheel secured to the first end of the axle; and a second wheel secured to the second end of the axle.

10. The product trolley of claim 9, wherein the first sidewall, the second sidewall, the endwall, and the axle guide are substantially continuously formed as a single piece.

11. The product trolley of claim 1, wherein the endwall of the base defines a thickness, wherein the endwall has a handle opening sized to receive a hand, and further wherein the handle opening is formed through the thickness of the endwall.

12. The product trolley of claim 1, further comprising a support projection substantially extending across a width of the base and disposed adjacent the support surface, the support projection adding stability to the base and cooperatively supporting the product trolley with the support surface.

* * * * *